(12) United States Patent  
Brown

(10) Patent No.: US 12,074,985 B2
(45) Date of Patent: *Aug. 27, 2024

(54) METHOD AND SYSTEM FOR DIGITAL SIGNATURES UTILIZING MULTIPLICATIVE SEMIGROUPS

(71) Applicant: BlackBerry Limited, Waterloo (CA)

(72) Inventor: Daniel Richard L. Brown, Mississauga (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,336

(22) Filed: Sep. 13, 2023

(65) Prior Publication Data

US 2024/0007303 A1 Jan. 4, 2024

Related U.S. Application Data

(63) Continuation of application No. 17/355,655, filed on Jun. 23, 2021, now Pat. No. 11,956,370.

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3242* (2013.01)

(58) Field of Classification Search
CPC .... H04L 9/3247; H04L 9/0825; H04L 9/3242
See application file for complete search history.

(56) References Cited

U.S. PATENT DOCUMENTS 5,146,500 A 9/1992 Maurer
5,999,627 A 12/1999 Lee et al.
(Continued)

FOREIGN PATENT DOCUMENTS

CA 3080861 A1 6/2019
CN 1464678 A 12/2003
(Continued)

OTHER PUBLICATIONS

China National Intellectual Property Administration office action for Application No. 201880076818.8 dated Aug. 23, 2023.
(Continued)

*Primary Examiner* — Darshan I Dhruv
(74) *Attorney, Agent, or Firm* — Moffat & Co

(57) ABSTRACT

A method for verification at a computing device of a signed message received from a first party over a public communications channel, the method including extracting a message digest "a" belonging to a semigroup from the signed message; obtaining a public key [c,e] for the first party, including a fixed value checker "c" and an endpoint "e", checker "c" and endpoint "e" belonging to the semigroup and the endpoint comprising a multiplication of a private key "b" for the first party and the checker "c", multiplying the message digest "a" and the endpoint "e" to create an endmatter "ae"; extracting a signature "d" from the signed message, the signature "d" belonging to the semigroup and being a multiplication of message digest "a" and private key "b"; multiplying the signature "d" and the checker "c" to create a signcheck "dc"; and verifying that the endmatter "ae" matches the signcheck "dc".

19 Claims, 5 Drawing Sheets

(56) References Cited

U.S. PATENT DOCUMENTS

| | | | |
|---|---|---|---|
| 6,212,637 B1* | 4/2001 | Ohta | H04L 9/3221 |
| | | | 713/180 |
| 9,166,793 B2* | 10/2015 | Poovendran | H04L 9/3242 |
| 10,637,656 B2 | 4/2020 | Brown | |
| 2001/0033656 A1 | 10/2001 | Gligor et al. | |
| 2002/0048364 A1 | 4/2002 | Gligor et al. | |
| 2012/0221858 A1* | 8/2012 | Struik | H04L 9/0844 |
| | | | 713/171 |
| 2019/0165936 A1* | 5/2019 | Brown | H04L 9/3066 |
| 2019/0319804 A1* | 10/2019 | Mathew | G09C 1/00 |
| 2020/0028674 A1* | 1/2020 | Bao | H04L 9/0637 |
| 2020/0228328 A1 | 7/2020 | Brown | |
| 2020/0358619 A1* | 11/2020 | Ding | H04L 9/3242 |
| 2022/0231843 A1* | 7/2022 | Garcia Morchon | H04L 9/3093 |

FOREIGN PATENT DOCUMENTS

| | | | | |
|---|---|---|---|---|
| CN | 101374043 A | 2/2009 | | |
| WO | 03013052 A1 | 2/2003 | | |
| WO | 2012107946 A2 | 8/2012 | | |
| WO | WO-2019069103 A1 * | 4/2019 | | H04L 9/0819 |
| WO | WO2019069103 A1 | 4/2019 | | |
| WO | WO-2020087805 A1 * | 5/2020 | | G06F 21/645 |
| WO | WO2020087805 A1 | 5/2020 | | |

OTHER PUBLICATIONS

United States Patent and Trademark Office (USPTO) Office Action for U.S. Appl. No. 18/086,798 dated Oct. 5, 2023, 69 pages.

Wikipedia, "Plactic Monoid", downloaded from https://en.wikipedia.org/w/index.php?title=Plactic_monoid&oldid=978374198; Sep. 14, 2020.

Donald E. Knuth, "Permutations, Matrices, and Generalized Young Tableaux", Pacific Journal of Mathematics, vol. 34, No. 3, pp. 709-727, Jul. 1970.

Alain Lascoux & Marcel P. Schutzenberger, "Le monoide plaxique", Quaderni de La Ricerca Scientifica, 109, Rome: CNR, pp. 129-156, 1981.

Berenstein, Arkady et al., "Geometric Key Establishment", Canadian Mathematical Society conference, Dec. 9, 2004, pp. 1-19.

Muhammad Rabi and Alan T. Sherman, "Associative One-Way Functions: A New Paradigm for Secret-Key Agreement and Digital Signatures", published at https://citeseerx.ist.psu.edu/viewdoc/download?doi=10.1.1.118.6837&rep=rep1&type=pdf, Nov. 15, 1993.

Official Action, U.S. Appl. No. 15/824,398, issued Jul. 30, 2019.

International Search Report and Written Opinion, PCT/CA2018/051503, issued Feb. 18, 2019.

Wang, Yongchuan et al., "Secret Key Sharing Scheme Based on the Theory of Algebraic Semigroups", Journal of Electronics, vol. 17, No. 3, pp. 238-241, Jul. 2000.

Extended European Search Report, EP18882393.4, mailed Aug. 15, 2020.

Extended European Search Report, EP21197552.9 mailed Oct. 8, 2021.

Notice of Allowance, U.S. Appl. No. 16/836,377, mailed Jan. 4, 2022.

Indian Patent Application No. 202047025538, Office Action dated Mar. 17, 2022.

Extended European Search Report, EP Application No. 22150626.4; Issued Jun. 28, 2022.

Kaori Fukuda, "Box-ball systems and Robinson-Schensted-Knuth correspondence", arxiv.org, Cornell University Library, May 28, 2001, XP080049416.

Benjamin Smith, "Pre- and post-quantum Diffie-Hellman from groups, actions, and isogenies", arxiv.org, Cornell University Library, Sep. 13, 2018, XP081190752.

U.S. Appl. No. 17/175,075, "Notice of Allowance and Fee(s) Due", Oct. 5, 2022.

European Search Report, Application No. EP 22 17 6119, dated Nov. 22, 2022, pp. 1-7.

Daniel R. L. Brown, "Plactic signatures", International Association for Cryptologic Research, vol. 19700101:000000, Sep. 30, 2021, pp. 1-31.

Jens Zumbrägel, "Public-Key Cryptography Based on Simple Semirings", Dissertation, University of Zurich, Jan. 1, 2008, pp. 1-109.

Notice of Allowance and Fees Due, U.S. Appl. No. 17/708,374, dated Mar. 29, 2023, pp. 1-43.

Canadian Intellectual Property Office (CIPO) Official Action and Examination Search Report for Application No. 3,146,196 dated Nov. 2, 2023, 6 pages.

* cited by examiner

310

312

METHOD AND SYSTEM FOR DIGITAL SIGNATURES UTILIZING MULTIPLICATIVE SEMIGROUPS

FIELD OF THE DISCLOSURE

The present disclosure relates to digital signatures for verifying the authenticity of digital messages or digests.

BACKGROUND

In cryptography, digital signature schemes define a set of rules for how a receiving party to a message can verify that the message originated from the intended sender. Typically, such scheme provides a layer a validation for messages sent over a non-secure channel, such as the Internet.

Various types of digital signature schemes exist. One commonly used scheme uses the Rivest-Shamir-Adleman (RSA) algorithm. In this algorithm the private key in a public key/private key pair can be used, typically in a hash function, to "sign" a message. The receiving party can then use the public key and the same hash function to find a value. If the value matches the signature, then the message has not been tampered with. The security in such system is based on the problem of factoring large numbers.

A second commonly used scheme is the Elliptic Curve Digital Signature Algorithm (ECDSA), which is an expansion of the Digital Signature Algorithm (DSA) using Elliptic Curve cryptography. These algorithms use modular exponentiation and the discrete logarithm problem for security.

However, quantum computers are emerging as a potential computing platform. Quantum computers use "quantum bits" rather than binary digits utilized in traditional computers. Such quantum computers would theoretically be able to solve certain problems much more quickly than classical computers, including integer factorization, which is the strength behind the RSA algorithm, and discrete logarithms, which is the strength behind ECDSA.

In particular, Peter Shor formulated Shor's quantum algorithm in 1994. This algorithm is known to attack digital signatures based on integer factorization or discrete logarithms if a sufficiently powerful quantum computer can be built. Utilizing such algorithm, the risk of a quantum computer discovering the secret for a party in digital signature schemes is nonzero. Therefore, counter measures to Shor's algorithm are needed.

BRIEF DESCRIPTION OF THE DRAWINGS

The present disclosure will be better understood with reference to the drawings, in which.

DETAILED DESCRIPTION OF THE DRAWINGS

Figure 1:
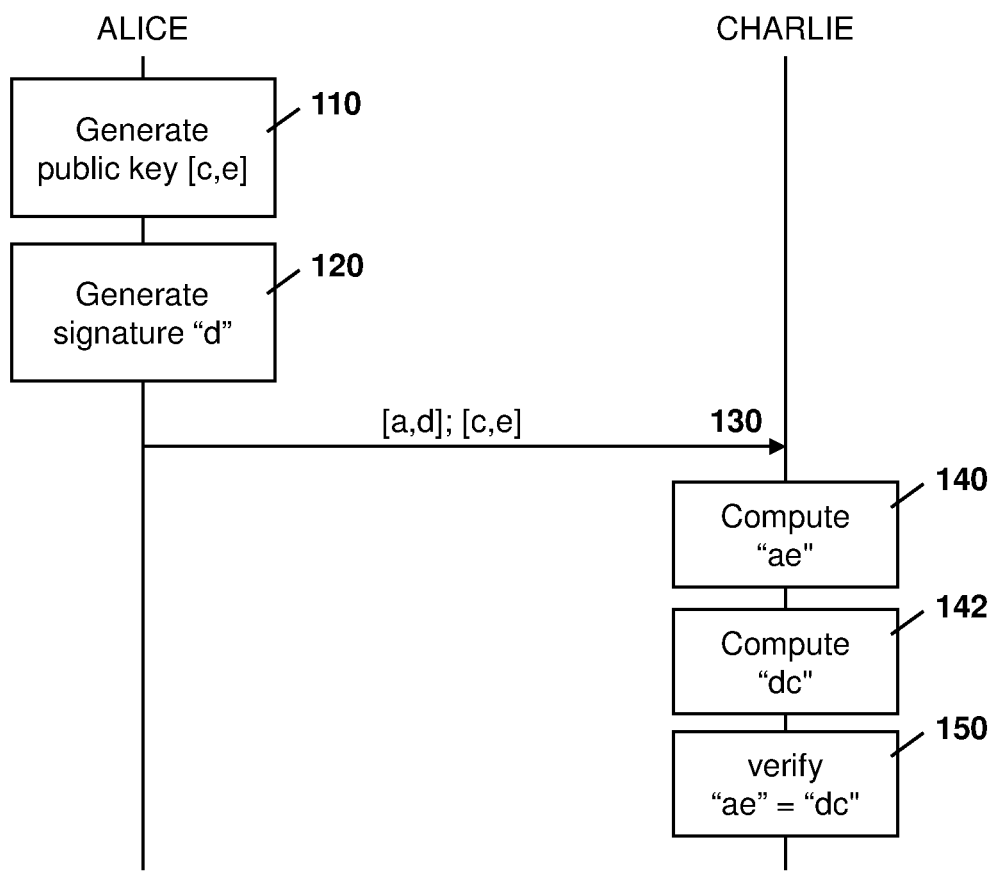
FIG. 1 is a dataflow diagram showing a multiplicative signature scheme.

The present disclosure provides a method for verification at a computing device of a signed message received from a first party over a public communications channel, the method comprising: extracting, by the computing device, a message digest "a" from the signed message, the message digest "a" belonging to a semigroup; obtaining, by the computing device, a public key [c,e] for the first party, elements of the public key including a checker "c" and an endpoint "e", checker "c" and endpoint "e" belonging to the semigroup and the endpoint comprising a multiplication of a private key "b" for the first party and the checker "c"; multiplying the message digest "a" and the endpoint "e" to create an endmatter "ae"="abc"; extracting, by the computing device, a signature "d" from the signed message, the signature "d" belonging to the semigroup and being a multiplication of message digest "a" and private key "b"; multiplying the signature "d" and the checker "c" to create a signcheck "dc"="abc"; and verifying that the endmatter "ae" matches the signcheck "dc", wherein the checker is a fixed value.

The present disclosure further provides a computing device configured for verification of a signed message received from a first party over a public communications channel, the computing device comprising: a processor; and a communications subsystem, wherein the computing device is configured to: extract a message digest "a" from the signed message, the message digest "a" belonging to a semigroup; obtain a public key [c,e] for the first party, elements of the public key including a checker "c" and an endpoint "e", checker "c" and endpoint "e" belonging to the semigroup and the endpoint comprising a multiplication of a private key "b" for the first party and the checker "c"; multiply the message digest "a" and the endpoint "e" to create an endmatter "ae"="abc"; extract a signature "d" from the signed message, the signature "d" belonging to the semigroup and being a multiplication of message digest "a" and private key "b"; multiply the signature "d" and the checker "c" to create a signcheck "dc"="abc"; and verify that the endmatter "ae" matches the signcheck "dc", wherein the checker is a fixed value.

The present disclosure further provides a computer readable medium for storing instruction code for verification of a signed message received from a first party over a public communications channel, the instruction code, when executed by a processor of a computing device, cause the computing device to: extract a message digest "a" from the signed message, the message digest "a" belonging to a semigroup; obtain a public key [c,e] for the first party, elements of the public key including a checker "c" and an endpoint "e", checker "c" and endpoint "e" belonging to the semigroup and the endpoint comprising a multiplication of a private key "b" for the first party and the checker "c"; multiply the message digest "a" and the endpoint "e" to create an endmatter "ae"="abc"; extract a signature "d" from the signed message, the signature "d" belonging to the semigroup and being a multiplication of message digest "a" and private key "b"; multiply the signature "d" and the checker "c" to create a signcheck "dc"="abc"; and verify that the endmatter "ae" matches the signcheck "dc", wherein the checker is a fixed value.

In accordance with the present disclosure, semigroups, which are a category of mathematical objects in algebra, may be used as a basis for multiplicative signature schemes. In one embodiment of the present disclosure, one example semigroup, namely a plactic monoid, may be used for a multiplicative signature scheme.

Multiplicative signatures, hashed multiplicative signatures, and Plactic monoids and their use in multiplicative signatures, are described below.

Semigroups

Semigroups are a category of mathematical objects in algebra. Each semigroup S has a set of elements, and a binary operation defined on the set. The binary operation must be associative. This means that:

$$a(bc)=(ab)c \quad (1)$$

In equation 1 above, a, b and c are in the semigroup S. Equation 1 indicates that when computing the product abc of three elements a, b and c, it does not matter if one multiplies a and b first, getting some value d=ab, and then multiplying d by c to get abc=dc, or if one first multiplies b and c to get a value e=bc and then multiplying a and e to get abc=ae.

Any set equipped with an associative binary operation is a semigroup.

Two examples of semigroup includes positive integers $\{1,2,3,\ldots\}$ under addition, and positive integers $\{1,2,3,\ldots\}$ under multiplication. These two examples share the same set, but have a different binary operation. As will be appreciated by those skilled in the art, there are many other semigroups besides the two defined above.

When discussing a general semigroup S, it is often assumed that the operation is written as multiplication. Furthermore, when a and b are variables represented with values in S, the product is written as ab, omitting any multiplication sign. However, in particular specific semigroups, such as positive integers under addition, a symbol "+" for a binary operation is used and the operation may be written as a+b instead of ab.

In some cases, semigroups S are commutative, which means that ab=ba for all a,b in S. In the example using the positive integer semigroups defined above, both examples are commutative.

Other semigroups are non-commutative. For example, matrices under multiplication would be non-commutative. In that case, in the product abc, the positions of a, b, and c matter for such product. Thus, abc may be different than bac and cab.

Associativity means that in the product abc, the order in which the two multiplications are carried out does not matter. Thus, either ab or bc could be computed first, but the final result is the same.

In accordance with the present disclosure, semigroups have a multiplication operator.

Semigroups are however not required to have a division operator. In some cases, a division operator may be formed, and is written as "/". A division operator is a binary operator having left and right input. If/is a binary operator on semigroup S, / may be defined as a strong divider if:

$$(ab)/b=a \quad (2)$$

Where equation 2 above is valid for all a,b in S.

The operator/may be defined as a partial strong divider if equation 2 above only holds for a subset of a,b values within S.

In semigroup nomenclature, the operation is generally written as ab/b instead of (ab)/b, which means that multiplications are done before divisions.

Further, a weak divider may also be defined for a semigroup. In particular, sometimes a semigroup has multiplication in which ab=db for many different values of d. In this case, there cannot be a strong divider. A "/" is a weak divider if:

$$(ab/b)b=ab \quad (3)$$

In equation 3, the weak divider is defined for all a, b and S.

A partial weak divider utilizes equation 3, but is only valid for a subset of values a, b within S.

In equations 2 and 3 above, the divider / is also called a right divider. Similarly, a binary operation "\" is called a left divider. The operator \ is a strong left divider if b\a=a. Further, the binary operator \ is a weak left divider if b(b\a)=ba.

In various semigroups, a divider operation may be known. For example, for positive integers under multiplication, it is the usual Euclidean division algorithm. For positive integers under addition, the division may become subtraction. Dividers are known for some matrix subgroups, where Bareiss elimination can be used.

Further, many of the constructions of a semigroup use a concept known as a semiring. A semiring R has two binary operations, namely addition and multiplication, each forming a semigroup on R. Addition is also commutative. Multiplication is distributed over addition, meaning that a(b+c)=ab+ac and (a+b)c=ac+bc for all a,b,c, in R. A basic example of a semiring includes positive integers under the usual addition and multiplication operations.

Structurally Secure Semigroups

Typical Diffie-Hellman groups, such as elliptic curves and modular multiplication groups, are cyclic groups, which are known to be isomorphic to modular addition groups. As used herein, isomorphic means that they share the same underlying group structure, even though they have different representations. Modular integer addition groups would be insecure if used as Diffie-Hellman groups since the division problem is easy. Fortunately, finding isomorphism is difficult (except by Shor's quantum computer algorithm), even though it is known to exist.

Accordingly, it can be said that elliptic curve groups and modular multiplication groups are "structurally insecure" as Diffie-Hellman groups, because they share the same structure as insecure Diffie-Hellman groups (modular addition groups). It should be noted by those skilled in the art that just saying a scheme is structurally insecure does not mean that it is insecure. However, such scheme may be suspected to be insecure because the only thing between such scheme and attack is isomorphism, which is known to exist. Such existential threat is commonplace in cryptography, but nonetheless it may be beneficial to find a cryptographic scheme for which there is no known existential threat. Such a scheme would be deemed to be structurally secure.

One specific example of a structurally secure scheme is known as the Vernam cipher, also known as a one-time pad. It has been proven that the confidentiality of such cipher is unconditionally secure. Such a scheme is therefore structurally secure. However, the one-time pad has other security issues (as it does not provide message integrity or authentication) and has practicality issues (that the one-time pad must be equal in size to the message, among other factors).

However, a one-time pad is not a signature scheme, but it is structurally secure in the sense above.

In accordance with the present disclosure, structurally secure signature schemes are sought.

Similarly, a semigroup may be structurally insecure if it has the same structure as a known weak semigroup. Therefore, in accordance with one embodiment of the present disclosure, to avoid structurally insecure semigroups two options are provided. A first is referred to as trial elimination, and the second is referred to as restriction.

With regard to trial elimination, the structure of a particular semigroup, up to isomorphism, may be examined. In many cases, it will be obvious that a weak semigroup of a structure exists. In that case, the semigroup may be eliminated, and examination may move to another semigroup. Because the semigroups are plentiful and even semigroups with varying structures are plentiful, this process can be continued.

Next, trial elimination may examine whether the structure of the semigroup includes a weak semigroup. As used herein, "weak" means that the use of the semigroup in a cryptographic system would permit a computationally feasible attack on the cryptographic system, and thus use of such system would make the cryptographic system computationally vulnerable.

If yes, the semigroup may be eliminated.

If no weak semigroups are known, then the semigroup may be kept as a possibility for a signature scheme.

A second strategy is referred to herein as restriction. In restriction, a property of the semigroup structure may be considered.

Specifically, semigroups may have various properties such as, commutativity, where st=ts for all s and t within the semigroup. Another property may be regularity in which, for all s within the semigroup there exists a t with sts=s. Other properties are provided for in Table 1 below.

The list of properties in Table 1 above is not exhaustive. Other properties may also be considered.

Based on the properties in Table 1 above, a determination may be made to consider whether the property is favorable to security or not. If the property is not favorable, all semigroups with that property are avoided for the selection of the semigroup for the signature scheme. A property is not favorable to security if such property renders the keys computationally vulnerable to being discovered.

Alternatively, if the property is favorable for security then the semigroup may be kept and may again be further analyzed with other properties. Alternatively, if the properties that are being examined have all been examined, then such semigroup may be selected as a possibility for a signature scheme.

Constructed Semigroups

In a further embodiment, semigroups can be constructed using building blocks such as other semigroups, or other types of algebraic objects, such as semirings, and even arbitrary functions. These constructed semigroups can have the same or better security than the individual building blocks.

TABLE 1

Example Semigroup Properties

| Property | Description/comments |
| --- | --- |
| Finite semigroups | Although every practical multiplicative signature scheme can be constructed from a semigroup, it could be the case the multiplicative signature schemes that are most naturally constructed from an infinite semigroup are more secure |
| Monoid | The presence of a multiplicative neutral (identity) element, often known as 1, makes a few tasks in the semigroup a little easier. But usually, an element 1 can be added into any semigroup. |
| Idempotent | Semigroups with this property are generally insecure, so non-idempotent semigroups should be sought. |
| Commutative | It would seem like non-commutative semigroups would be more secure |
| Exponential growth | Gromov introduced the idea of polynomial and exponential growth in groups, which can also be applied to semigroups |
| Cancellative | In cancellative semigroups, multiplication is injective. Cancellative semigroups might be more secure, because no information is lost. But they might also be less secure, for the same reason. They are much closer to groups, which means that they might be less post-quantum secure |
| Groups | Groups are a special subset of semigroups. Generally, groups seem to be vulnerable to Shor's postquantum attack algorithm |
| Regular semigroups | These are groups in which each element s has a semigroup inverse, meaning an element t such that sts = s. Regular semigroups are somewhat closer to groups, so might be less post-quantum secure than non-regular semigroups. Also, a semigroup inverse of b can be used to solve the wedge problem, even to solve the weak division problem. So, if a semigroup is regular, it may mean it is easy to find the semigroup inverse (because they always exist). |
| Nilpotent semigroup | a nilpotent semigroup is a semigroup in which every element multiplied by itself enough times results in a value 0. Every multiplicative signature scheme can be constructed from a nilpotent semigroup, but it may be the case that if the most natural semigroup from which a semigroup is constructed is not nilpotent, then multiplicative signature is more secure |
| Fundamental semigroup | A fundamental semigroup cannot be mapped to any other non-isomorphic semigroup (mapped while preserving multiplication) |
| Bisimple semigroup | Also known as a Reilly semigroup |

Thereafter, each semigroup construction can be used to build a signature scheme. The semigroup construction can use the same or diverse types of building blocks to form such semigroup.

As used herein, a semiring is a pair of semigroups sharing the sets, with one operation written additively and the other multiplicatively. Further, in a semiring, distributive laws hold. In particular, a(b+c)=ab+ac and (a+b)c=ac+bc. Unless noted otherwise, addition in a semiring is assumed to be commutative.

To avoid confusion, in the embodiments below, constructions from building blocks are distinguished by labelling the building blocks with the adjective "base". For example, if a given semiring is taken as a building block, such as a semiring R of positive integers, then we construct a semiring S of 3×3 square matrices whose entries belong to R. Since both R and S are semirings, to avoid confusion we say that R is the base semiring. In this case, each semiring element (of S) is a matrix whose entries belong to the base semiring R.

Table 2 below provides a partial list of example constructions that can be used to build a semigroup. In many cases, such semigroup may be built from other building blocks, such as other semigroups or sometimes through a semiring.

Utilizing the embodiments of Table 2 above, in a direct product of the base semigroups, the resulting semigroup is at least as secure as the strongest base semigroup. This is the strongest link construction.

In other constructions, each construction may boost the security compared to the base objects. Thus, the aim is for security amplification.

In one example, consider a semigroup based on resultants of bivariate polynomials. The semigroup is first described mathematically. The details of using such semigroup in a cryptographic system are then described.

Let Z be the ring of integers. Let Z[x,y] be the set of bivariate polynomials with integer coefficients. Normally, Z[x,y] is treated like a ring R, under polynomial and addition, but here we give Z[x,y] a different semiring structure B. Addition in B, written as +B, is multiplication in R. Multiplication in B, written as *, uses the resultant operation, so $(f*g)(x,y)=\text{Rest}(f(x,t),g(t,y))$.

Now, B is a semiring with non-commutative multiplication. This follows from the well-known theory of resultants. For example, $\text{Res}(f,gh)=\text{Res}(f,g)\text{Res}(f,h)$, proves the distributive law.

In particular, a semigroup S can be formed, with multiplication written *, by using 2 by 2 square matrices with entries in B, and where S multiplication is B-matrix multiplication (using operations in B).

TABLE 2

Example Constructions
Description/comments

Forming an addition semigroup S of (base) semiring R (using addition of R)
Forming a multiplication semigroup S of a (base) semiring R (using multiplication of R)
Forming a semiring S of matrices from a base semiring R, (using standard matrix addition and multiplication)
Forming a semiring S of polynomials from a base semiring R (using standard polynomial addition and multiplication).
Forming a semiring S consisting of a set of (fractional) ideals in a base ring R (using standard ideal addition and multiplication).
Forming a semiring S from a base semiring R and a base semigroup G, called the semigroup algebra: the elements of S are formal R-combinations of elements G.
Forming a semiring R of endomorphisms of a commutative (additive) base semiring A (using point-wise addition of functions for addition in R, and function-composition for multiplication in R)
Forming a semiring R of bivariate polynomials by using the resultant operation, where addition in R is standard polynomial multiplication, and multiplication in R is the resultant. This is explained further below.
Forming a semigroup S as a direct product of base semigroups T and U (category theory product), so elements of S are pairs (t, u) with t in T and u in U, and multiplication defined as (t, u)(x, y) = (tx, uy).
Forming a semigroup S as a compositum of base semigroups T and U (category theory coproduct). Elements of S are ordered sequences with entries that alternate between members of T and U. In a product, one may concatenate sequences, except if adjacent belong to the same base semigroup, one may multiply them. For example, $(t_1, u_1, t_2)(t_3, u_2) = (t_1, u_1, t_2t_3, u_2)$.
Forming a semigroup S as a disjunction of base semigroups T and U: elements of S are the elements T and elements of a copy of U (disjoint from T), and error element. All products have the result error, unless they belong to the same base semiring, in which case they multiply accordingly.
Forming a semigroup S from a set X, by taking all functions from the set to itself: multiplication in S is composition of functions
Forming a semigroup S from an arbitrary single binary function f, which maps pairs (a, b) to values c, with a,b,c, from sets A, B, C respectively. Form S, taking disjoint copies of the sets A, B, C an error value. Multiplication in S defaults to the error value, except it the operands are some a from A and some b from B, in which the the result is ab = c = f(a, b).
Forming a semigroup R from the set of all relations (or directed graphs) on a set X. A relation r in R is a set of pairs (x, u) with x, y from X. Given two relations r and s, the product relation rs is defined as the set of all pairs (x, z) such that there exists y in X with (x, y) in r and (y, z) in s.

An example of multiplication in S. Let $$a = \frac{(15x^2 + y \quad 4xy + 1)}{(2x + y^2 \quad y - 7)} \quad (4)$$

$$b = \frac{(6xy + 8 \quad x + 11)}{(3x + 2y \quad y^2 + 9)} \quad (5)$$

Then:

$$a*b = \frac{\begin{pmatrix} ((15x^2+y)*(6xy+8)+ & (15x^2+y)*(x+11)+ \\ {}_B(4xy+1)*(3x+2y) & {}_B(4xy+1)*(y^2+9) \end{pmatrix}}{\begin{pmatrix} ((2x+y^2)*(6xy+8)+ & (2x+y^2)*(x+11)+ \\ {}_B(y-7)*(3x+2y) & {}_B(y-7)*(y^2+9) \end{pmatrix}} \quad (6)$$

which equals the matrix:

$$\begin{pmatrix} (Res_t(15x^2+t, 6ty+8) & Res_t(15x^2+t, t+11) \\ Res_t(4xt+1, 3t+2y) & Res_t(4xt+1, y^2+9)) \\ \hline (Res_t(2x+t^2, 6ty+8) & Res_t(2x+t^2, t+11) \\ Res_t(t-7, 3t+2y) & Res_t(t-7, y^2+9)) \end{pmatrix} \quad (7)$$

So, now there are eight resultants to compute. One way to compute a resultant is to compute the determinant of the Sylvester matrix.

In this disclosure, the horizontal, ascending version of the Sylvester matrix is defined. The Sylvester matrix is a square matrix with sides length equal to the sum of the degrees in the active variables, in this case variable t. The t coefficients of each input polynomial are arranged horizontally, in ascending order, from the lowest degree term to the highest. Zeros fill the remaining entries of the row. Each polynomial is used in a number of rows matching the degree of the other polynomial. Each use of the polynomial is shifted once to the right, until it reaches the right side of the matrix.

Other arrangements, such as vertical or descending, for the Sylvester matrix are also possible (and sometimes used in textbooks), but they at most change the sign.

For example, $$Res_t(2x+t^2, 6ty+8) = \det\begin{pmatrix} 2x & 0 & 1 \\ 8 & 6y & 0 \\ 0 & 8 & 6y \end{pmatrix} \quad (8)$$

The determinant in this case is $72xy^2+64$. Computing all 8 determinants similarly, one gets that:

$$ab = \begin{pmatrix} (90x^2y-8)(3-8xy) & (15x^2-11)(y^2+9) \\ (72xy^2+65)(-7-2y) & (2x+121)(y^2+9) \end{pmatrix} \quad (9)$$

Finally, one can expand each entry, which are given above as standard polynomial products, into sums, as follows:

$$a*b = \begin{pmatrix} \begin{vmatrix} -720x^3y^2+270x^2y+ \\ 64xy-24 \\ -144xy^3-504xy^2- \\ 130y-455 \end{vmatrix} & \begin{vmatrix} 15x^2y^2+135x^2- \\ 11y^2-99 \\ 2xy^2+121y^2+ \\ 18x+1089 \end{vmatrix} \end{pmatrix} \quad (10)$$

For better security, a starting polynomial (e.g. private key b) should be chosen with a higher degree and larger coefficient. Also, matrices with more rows and columns may be used. It should then be much more difficult to determine b from a*b and a.

The typical known algorithms for matrix division, such as Bareiss reduction, work over matrices with entries in a commutative ring. But here the matrix entries are not commutative, and not even a ring. For example, subtraction is not possible. Perhaps B can be extended to a ring, by introducing formal differences (in a manner similar to how negative integers can be introduced as formal difference of positive integers). But then division and the non-commutativity need to be dealt with. These difficulties may represent a significant hurdle to cryptanalysis.

Those skilled in the art may notice that that a*b was initially obtained in a form whose entries were products of resultants over the entries a and b. If the entries of a*b can be factored, then the factors can try to be matched to the entries of b, and then division in the semiring B be performed, to extract the entries of b.

This attack strategy requires polynomial factorization. Polynomial factorization, for large integer coefficients and high degree polynomials can be difficult for conventional (non-quantum) computers.

A quantum computer may make polynomial factorization easier. However, to address the quantum computer risk, another measure can be used. Ensure the input matrices a and b have entries which are products too. The product a*b matrix entries can still be factored, but now there may be many more factors, and there may not be any easy way to match factors of the a*b entries to those of b.

Table 2 above listed various well-known construction of semi-groups that may be used to build up semigroups (from more base semigroups) with better security.

Two users that may communicate are referred to herein as Alice and Charlie. In multiplicative signature schemes, generally Alice may send Charlie a signed message, where Charlie will have access to Alice's public key to verify the signed document. If Alice and Charlie to use such semigroups for multiplicative signature schemes, they need to be able to send and represent semigroup elements to each other. So, that means that they must have some means of converting a semigroup element into a sequence of bytes. Such byte representations are commonly used in cryptography. They are used in Rivest-Shamir-Adleman (RSA), Elliptic Curve Cryptography (ECC) and many other systems.

A system for the semigroup based on resultants, which was described mathematically above, is described below.

In some cases, a new byte-encoding scheme may be used for such semigroup. Alternatively, rather the devising an entirely new byte-encoding scheme, in one embodiment some existing byte-encoding scheme that can do two things: encode integers, and encode sequences of other objects, may be used. Abstract Syntax Notation 1 (ASN.1) can do this (or more precisely ASN.1 Basic Encoding Rules can do this). Another encoding systems is Javascript Object Notations (JSON).

In one embodiment, a matrix may be represented as a sequence of its rows. Further, a row may be represented as a sequence of entries. A bivariate polynomial in variables x and y may be represented as a sequence of y coefficients, in order of increasing degree, starting from degree zero, with each coefficient being a univariate polynomial in variable x. (But represent a zero polynomial as an empty sequence.) A univariate polynomial in x may be represented as a sequence of coefficients in ascending degree starting from degree zero, with each coefficient being an integer (and represent a zero polynomial by an empty sequence).

Suppose that a sequence of objects a, b, c is represented as [a,b,c], where each object a,b,c being replaced by its representation. Suppose integers are represented in the usual decimal form.

Consider the example a*b from Equation 13 above. Its representation is: [[[[−24],[0,64,270],[0,0,0,−720]],[[−99,0,135],[ ],[−11,0,15]]],[[[−455],[−130],[0,−504],[0,−144]],[[1089,18],[ ],[121,2]]]].

From these nested sequences and integers, a byte encoding is relatively easy. The most naïve is to just use ASCII text.

As noted above, Alice would likely use larger parameters than the shown in the example, in order to achieve better security. So, Alice would use larger integers, higher-degree polynomials, and matrices with more entries. But they could still use the encoding scheme described above, even they use much larger parameters. Larger parameters do mean that Alice must exchange a greater number of bytes with Charlie.

In addition to the embodiments above using resultants, which describes a new semigroup, and the brief sketch, there are also the semigroups listed in the separate technical and research reports. Again, these various semigroups can be combined into larger semigroups. In some cases, the semigroups involve semirings.

The list below shows, by name, various such semigroups:
Numerical semigroups
Groups (the most well-studied subcategory of semigroups)
Subsemigroups
Image semigroups
Restriction semigroups
Extended semigroups
Converse semigroups
Product semigroups (direct products)
Compositum semigroups (free products)
Disjunction semigroups
Rees matrix semigroups
Polynomial function semigroups
Monogenic (cyclic) semigroups
Zero (constant) semigroups
Left and right semigroups
Boolean semigroups
Word semigroups
Transformation (function) semigroups
Partial transformation semigroups
Relation semigroups
Arbitrary binary operation semigroups
Semiautomata semigroups
Semigroups from totally order sets and lattices
Characteristic semigroup of a semigroup (see [L])
Semigroup from semirings (addition or multiplication)
Semirings with left addition, and any semigroup for multiplication
Semirings with left multiplication, and any idempotent semigroup for addition
Semiring that is the semigroup algebra (see research report and [O])
Hahn series, extension of the semigroup algebra, when the semigroup is totally ordered.
Endomorphism semiring of a semigroup
Semirings from totally order sets with a selected zero-like set
Boolean semirings
Relation semirings
Semirings from lattices, using meet and join
Semirings from partially order sets using the incidence algebra
Semirings with infinite sums, from topologies, using union for addition, intersection for multiplication
Semigroup of oriented knots, or manifolds, using the connected sum as the semigroup operation
Semirings with infinite sums, from non-negative real numbers
Semirings with one point extensions
Semirings of polynomials
Semirings of matrices
Semirings of resultants
Semiring of category algebras
Semigroups of objects in a category with products and coproducts
Rings (the most well-studied subcategory of semirings)
Weyl algebra
Integer-value polynomials (a non-Noetherian ring)
Semiring of ideals of a ring (under ideal addition and multiplication), such as standard polynomial ring
Semiring of modules of a ring (under direct sum and tensor product)
Semiring of fractional ideals of a ring
Semiring of continuous function defined on a unit square using the Fredholm operation for multiplication
Semigroups with error correction
Semigroups from near-rings.

Consider the semiring of ideals of a standard polynomial ring. The theory of Groebner bases provides a unique representation of each ideal, in terms of its basis.

Then addition and multiplication are straightforward: to add just take the union of the bases, and to multiply the ideals just multiply the bases. Then re-normalize the basis using Buchberger's algorithm. This give a semiring, so an additive semigroup and multiplicative semigroup. The additive semigroup is idempotent, so the wedge problem is easy. The multiplicative semigroup has a known efficient division algorithm, the idea quotient algorithm, which is not quite as efficient as the multiplication algorithm. Therefore, this semigroup is probably not suitable for direct use in multiplicative signature schemes.

However, the semiring maybe useful as an intermediate step of a more complicated construction. For example, it can be used as a base semiring in forming matrices, or in forming a semigroup algebra. The fact that strong subtraction in not possible in the semiring of ideals might make a known algorithm such as the Bareiss algorithm for matrix division infeasible.

Converting a Semigroup into a Multiplicative Signature Scheme

Any semigroup may be converted into a multiplicative signature scheme. Examples of such semigroups are provided above.

Based on the above, if a secure, post quantum resistant signature scheme is possible, it can be created utilizing the methods and systems in accordance with the present disclosure, along with some subgroup.

Reference is now made to FIG. 1. In the embodiment of FIG. 1, the following terminology is used:

TABLE 3

Summary of Multiplicative Signatures

| Notation | Name | Typically: |
|---|---|---|
| a | Matter | A message digest |
| b | Private key | Secret to one signer |
| c | Checker | Fixed system wide |
| d | Signature | Appended to the signed matter |
| e | Endpoint | Signer-specific value |
| [a, d] | Signed matter | Thing to be verified |
| [c, e] | Public key | Certified as signer's public key |
| e = bc | Key generation | Signer uses private key b |
| d = ab | Signing | Signer uses private key b |
| ae = dc | Verifying | Verifier uses public information |

In accordance with Table 3, the variables a, b, c, d and e are elements of a semigroup. As indicated above, the main requirement of a semigroup and its elements is that any two elements can be multiplied, for some form of multiplication that obeys the associative law $a(bc)=(ab)c$.

The elements a, b, c, d and e are not necessarily numbers. The multiplication is therefore not necessarily the traditional multiplication of numbers. For example, one semigroup which could be used is the plactic monoid, as described below.

A public key is a pair [c,e] of the elements. A public key is also called a signature verification key. Element c is the checker and in accordance with the embodiments here in, is fixed system wide. Element e is the endpoint. Generally, element e is specific to a single signer.

For simplicity in the present disclosure, signers are named using their public keys. In reality, a public key infrastructure (PKI) would be used to establish each signer's public key [c,e], binding the cryptographic value [c,e] to a more legible name of the signer.

The signer's public key is generally embedded into a certificate which certifies that the [c,e] belongs to the signer. A typical PKI distributes some certificates manually as root certificates, and then transfers trust to other certificates using digital signatures.

A signed matter is a pair [a,d] of elements. Element a is the matter and element d is the signature. The matter is usually derived as a digest of a meaningful message. A matter is sometimes common to many signers, for example when short messages need to be signed.

With regards to terminology, it is often said that d is a signature on matter a, or that d is a signature over a.

Reference is now made to FIG. 1 in which a user, referred to herein as "Alice" wishes to send a signed message to a second user "Charlie". In this regard, at block 110, Alice may generate a public key [c,e] using her private key, referred to as element b. in particular, a private key b for public key [c,e] is an element b such that:

$$e=bc \quad (11)$$

A public key [c,e] is viable if there exists at least one private key b for [c,e].

At block 110, Alice can choose private key b before choosing a public key[c,e] by computing the endpoint e from equation 14 above. This results in a viable public key.

From block 110, the process proceeds to block 120 in which Alice may generate a signature d. In particular, Alice can sign matter a using private key b in accordance with the equation 15.

$$d=ab \quad (12)$$

Alice may then provide the signed matter [a,d] to Charlie as shown with message 130. In some embodiments, the public key [c,e] is also provided in message 130. However, in other cases, the public key may be published through other mechanisms.

Charlie receives message 130 and may obtain the signed matter [a,d] from the message. Charlie may further obtain the public key for Alice [c,e] either from a message 130 or through other mechanisms.

Further, as the checker is common system wide in the present embodiments, in some cases message 130 may only contain the endpoint. In other cases, the endpoint may be published through other mechanisms, without the checker, as the checker would be known to both Alice and Charlie. Other options are possible.

At block 140 Charlie may compute the endmatter ae by multiplying elements a and e.

At block 142, Charlie may compute the signcheck dc by multiplying elements d and c.

In particular, it is sometimes useful to discuss both sides of equation one separately because they can be different in invalid signatures, because they require separate computations, and because they can help identify when an existing signature scheme is similar to a multiplicative signature scheme.

Therefore, at block 150, a check can be made to determine whether the endmatter and the signcheck are the same. Specifically, the signed matter [a,d] is verifiable for [c,e] because multiplication is associative in accordance with equation 13 below.

$$ae=a(bc)=(ab)c=dc \quad (13)$$

Therefore, based on the results of block 150, Charlie can verify whether Alice signed matter a.

As will be appreciated by those in the art, the signer should keep the private key b private so that no one else can generate signatures under [c,e].

Converting a Semigroup into a Hashed Multiplicative Signature Scheme

In cryptography, a hash function is an algorithm that maps an arbitrary length input to a fixed sized output with a one way function. In particular, a hash function is deterministic, meaning that it gives the same results for the same message. Further, as a hash function is one-way, it is infeasible to obtain the message given the hash value.

In some embodiments, hash functions may be a keyed hash function. In this case, the hash function uses both a cryptographic key k and a cryptographic hash function.

A hashed multiplicative signature scheme modifies the multiplicative signature scheme of FIG. 1 as outlined below. Table 4 provides for a summary of this scheme.

TABLE 4

Summary of Hashed Multiplicative Signatures

| Notation | Name | Typically: |
|---|---|---|
| a | Matter | A message digest |
| b | Private key | Secret to one signer |
| c | Checker | Fixed system wide |
| d | Raw Signature | Appended to the signed matter |
| e | Endpoint | Signer-specific value |
| f | Hash function | Fixed or signer-chosen key |
| [d, f] | Signature | Extension of raw signature |
| [m, d, f] | Signed message | Thing to be verified |
| [c, e] | Public key | Certified as signer's public key |
| a = f(m) | Digesting | Signer and verifier compute short a |
| e = bc | Key generation | Signer uses private key b |
| d = ab | Signing | Signer uses private key b |
| ae = dc | Verifying | Verifier uses public information |

Based on Table 4, hashed multiplicative signatures signers and verifiers compute the matter from the hash as:

$$a = f(m) \quad (14)$$

In equation 14 above, m is the message and $f(m)$ is the hash function that is applied to the message.

Figure 2:
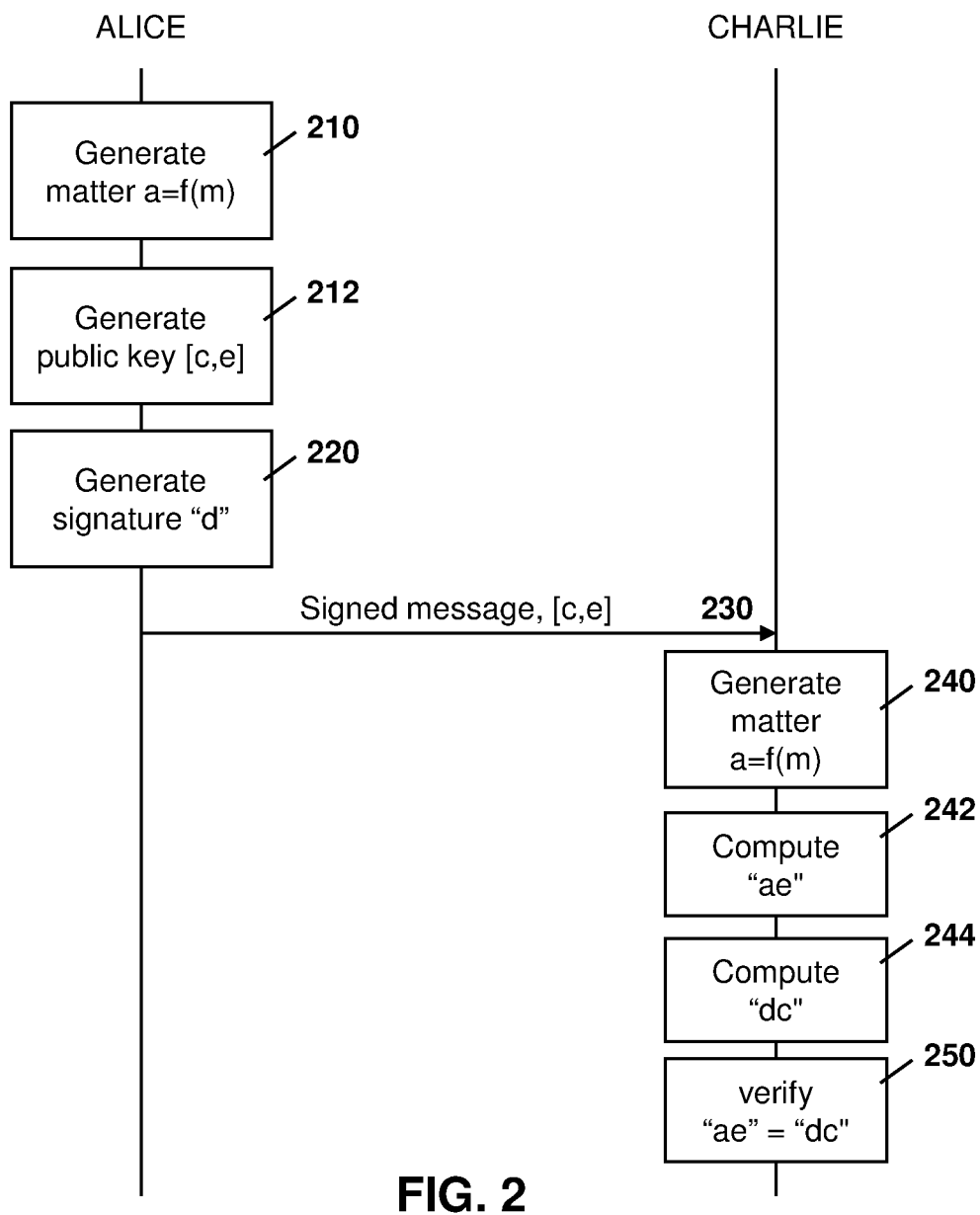
FIG. 2 is dataflow diagram showing a hashed multiplicative signature scheme.

Therefore, reference is now made to FIG. 2. In the embodiment of FIG. 2, Alice generates a hash of the message at block 210 to create the message digest a utilizing equation 14 above.

At block 212, Alice may generate a public key [c,e] using her private key, referred to as element b. In particular, a private key b for public key [c,e] is an element b such that equation 11 above is satisfied.

A public key [c,e] is viable if there exists at least one private key b for [c,e].

At block 212, Alice can choose private key b before choosing a public key[c,e] by computing the endpoint e from equation 11 above. This results in a viable public key.

At block 220, utilizing equation 12 above and equation 14, the raw signature d can be computed by Alice.

Alice may then provide the signed message in the form [m,d,$f$] in message 230 to Charlie. In some embodiments, message 230 may further include Alice's public key [c,e]. However, as cis known system wide, it may in some cases not form part of message 230. Further, the endpoint for Alice may be published in other ways besides in message 230 and therefore, in some cases the public key is not provided in message 230.

Further, in some embodiments, the hash function $f$ may take the form of equation 15.

$$f(m) = h_k(m) \quad (15)$$

In equation 15 above, h is a keyed hash function having a key k. In this case, the hash function h may be fixed across the whole system and in this case, the key k is sufficient to specify function $f$. This allows $f$ to have a short specification so that the signature [d,$f$] is not too long. For example, the signature could be [d,k].

In this case, message 230 could transmit the signed message as [m,d,k] rather than [m,d,$f$].

Further, in some embodiments, the key k can be fixed for the whole system. In this case, it may be unnecessary for a signer to transmit the key k to the verifier. In this case, the signed message [m,d,$f$] reduces to [m,d] in message 230.

When the key k is not fixed, it can be chosen in various ways. Sometimes Alice may choose the key k randomly from a key space. Sometimes Alice may choose key k as a deterministic, pseudorandom function of the message. For example, equation 16 may be used:

$$k = h_b(m) \quad (16)$$

In equation 16, the key k is therefore derived based on the private key of Alice.

Further, in some cases, the multiplicative signature scheme from the embodiment of FIG. 1 could be considered a special case of the hashed multiplication signature scheme of FIG. 2 when the hash function is unity.

Further, in some embodiments, the hash function used with FIG. 2 is not necessarily a standard hash function, since it needs to map messages into semigroup elements using the multiplicative signature scheme of the embodiment of FIG. 2. Rather, some form of embedded hashing may be used.

The use of embedding is common in other types of signatures as well. For example, in RSA signatures, such embedded hashing is often called full domain hashing.

As described below, in the case of plactic signatures, a message may be mapped into a semistandard tableau. A traditional hash can be represented as a byte string. Standard techniques allow this byte string to be made as long as necessary. A simple way to turn a byte string into a semi-standard tableau is to convert it into a string of characters or integers or any sortable entries, and then apply the Robinson-Schensted algorithm, which converts the string into a tableau.

A benefit of hashing is that a long message m can have a short hash, which usually means that the signature d=ab is short. Further, hashing algorithms are typically faster than secure semigroup multiplication.

Referring again to FIG. 2, Charlie receives message 230 and at block 240 may generate the matter $a = f(m)$.

At block 242 Charlie may compute the endmatter ae by multiplying elements a and e. In particular, in this case the endmatter is $f(m)e$.

At block 244, Charlie may compute the signcheck dc by multiplying elements d and c.

At block 250, a check can be made to determine whether the endmatter and the signcheck are the same. Specifically, the signed matter [m,d,$f$] is verifiable for [c,e] because each element is a Semigroup, and therefore multiplication is associative in accordance with equation 17 below.

$$f(m)e = a(bc) = (ab)c = dc \quad (17)$$

Therefore, based on the results of block 250, Charlie can verify whether Alice signed matter m.

As will be appreciated by those in the art, the signer should keep the private key b private so that no one else can generate signatures under [c,e].

The Plactic Monoid

One semigroup that may be used for the embodiments of the present disclosure is a plactic monoid. A monoid is any semigroup with an identity element. When clear from context, the identity element is written as 1. Being an identity element means 1 a=a=a1 for all a in the monoid.

Figure 3A:
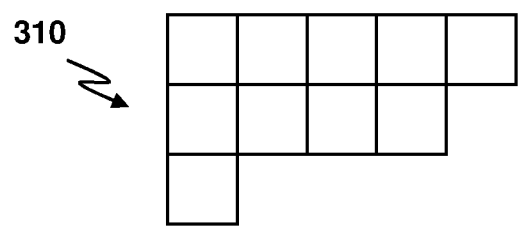
FIG. 3A is a block diagram showing a Young diagram in English notation.
Figure 3B:
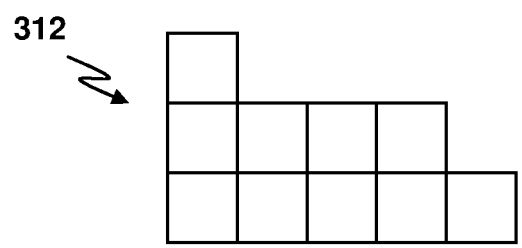
FIG. 3B is a block diagram showing a Young diagram in French notation.

A tableau consists of rows of symbols, sorted by length. For example, Alfred Young in 1900 defined a set of boxes or cells arranged in a left-justified form, now known as a Young diagram. FIG. 3A shows a Young diagram 310 in which the cells are sorted by length from the top down, with the top being the longest. This is referred to as English notation. FIG. 3B shows a Young diagram 312 sorted by length with the bottom being the longest. This is referred to a French notation. The embodiments of the present disclosure could use either notation, but French notation is used as an example in the present disclosure.

A Young tableau comprises filling the boxes in the Young diagram with symbols from some ordered set. If the ordered set has no duplicates, this is referred to as a standard tableau. If the symbols in the ordered set are allowed to repeat, this may create a semistandard tableau. Specifically, in a semi-standard tableau, each row is sorted from lowest to highest (left to right), with repeats allowed. Also, in a semistandard tableau, each is column is sorted, but with no repeats allowed. In French notation, the columns are sorted lowest-to-highest (bottom-to-up).

An example of a semistandard tableau with single-digit symbols is shown with regards to Table 5 below.

TABLE 5

Example semistandard tableau with single-digit symbols 7
669

TABLE 5-continued

Example semistandard tableau with single-digit symbols 5556689
444456666
3333355556
222222344444
1111111111111133

Knuth (1970) defined an associative binary operation applicable to semistandard Young tableaus via algorithms of Robinson (1938) and Schensted (1961). Schutzenberger and Lascoux (1980) studied the resulting algebra, naming it the plactic monoid.

Multiplication can occur on a symbol by symbol basis. An example is shown in Table 6 below, which shows the creation of a plactic monoid based on the string 'helloworld' using a single-symbol tableau. In Table 6, each row must be sorted. In this case, when the next symbol can be added to the end of bottom row and leave the row sorted, it is added to this row. When the symbol cannot be added to the end of the bottom row, it replaces the symbol in that row which would leave the row sorted, and the replaced symbol is added to the row above in a similar fashion. If there is no row above a symbol, then a new row is created.

TABLE 6

Example Knuth multiplication

| Symbol | Tableau | Notes |
|---|---|---|
| h | h | Since no row existed, h, forms the first row |
| e | h<br>e | Since 'e' is before 'h', it replaces this symbol and the 'h' is moved to the row above |
| l | h<br>el | 'l' can be added to the end of the last row |
| l | h<br>ell | 'l' can be added to the end of the last row |
| o | h<br>ello | 'o' can be added to the end of the last row |
| w | h<br>ellow | 'w' can be added to the end of the last row |
| o | hw<br>elloo | "o" cannot be added to the end of the last row, so it replaces the 'w', and the 'w' moves up to the next row. |
| r | hw<br>elloor | 'r' can be added to the end of the last row |
| l | w<br>ho<br>elllor | 'l' replaces the 'o' in the bottom row. 'o' replaces 'w' in the second row. 'w' moves up and creates a new row. |
| d | w<br>h<br>eo<br>dlllor | 'd' replaces the 'e' in the first row. 'e' replaces the 'h' in the second row. 'h' replaces the 'w' in the third row. 'w' moves up and creates a new row. |

As seen from Table 6, multiplication is achieved through repeated insertion of symbols in a semistandard tableau.

In some embodiments, a string equivalence may be created from the tableau of Table 6. Specifically, instead of considering the plactic monoid as the set of semistandard tableaus, the set of all string forms may be considered up to equivalence relation. Two strings are equivalent if they generate the same semistandard tableaus. In this form, each tableau has alternate representation as strings, From the last row of Table 6 for the "helloworld" string, the row reading string is "wheodlllor" and the column reading string is "whedolllor". These two strings, and several others, will generate the same tableau as "helloworld" generates.

The "helloworld" and "wheodlllor" strings are equivalent because they both generate the same tableau. Thus they are both alternative representations of the same semistandard tableau.

A simplified example of a C program to implement such multiplication is shown with regards to Table 7 below.

TABLE 7

Example C program for Knuth multiplication

```
#include <stdio.h>
#define T(a,b)(a^=b,b^=a,a^=b,1)
enum{L=1000000};typedef char*s,S[L];typedef int i;typedef void _;
i knuth(i i,s w){return(w[2]<w[i-1])&(w[0]<=w[i])&&T(w[1],w[(i+1)
%3]);}
_ robinson(s w,i j){i i; for(;j>=2&&w[j]<w[j-1];j--)
for(i=1;i<=2;i++) for(;j>=2&&knuth(i,w+j-2);j--) ; }
_ get(s w){i i=0,c; while(i<L && (c=getchar( ))!=EOF)
if(0!=c && '\n'!=c) w[i]=c, robinson(w,i++);}
_ put(s w){char o=0; for(;*w;w++) o>*w?puts(""):0, putchar(*w), o=*w;}
i main(_){S w={ };get(w);put(w);puts("");}
```

In the example code in Table 7, the program input is any text, with each ASCII character except nulls and newlines representing a generator element of the plactic monoid. The output of the program is a product of these, according to Knuth's version of the Robinson-Schensted algorithm, represented as a semistandard tableau, as shown for example in Table 6.

While the examples of Tables 6 and 7 use ASCII characters as the ordered set for single-symbol tableaus, in practice any ordered set may be used as long as it is agreed to by both parties in a digital signature situation, as described below. Further, while single-symbol tableaus are provided in the examples, in practice multi-symbol tableaus could equally be used.

Each element of the plactic monoid is therefore a product of symbols (also called generators). Products of symbols are considered equivalent if they can be related by a sequence of Knuth transformations as described above.

Elements of the plactic monoid are therefore equivalence classes of such products of symbols.

Multiplicative Signatures Using Plactic Monoids

As a plactic monoid is a semigroup, it can be used for multiplicative signatures, referred to herein as plactic signatures. Further, as the plactic monoid does not seem closely related to the RSA or ECDSA, the security of plactic signatures is independent of security these signature schemes. Plactic signatures therefore seem resistant to known quantum attacks.

Figure 4:
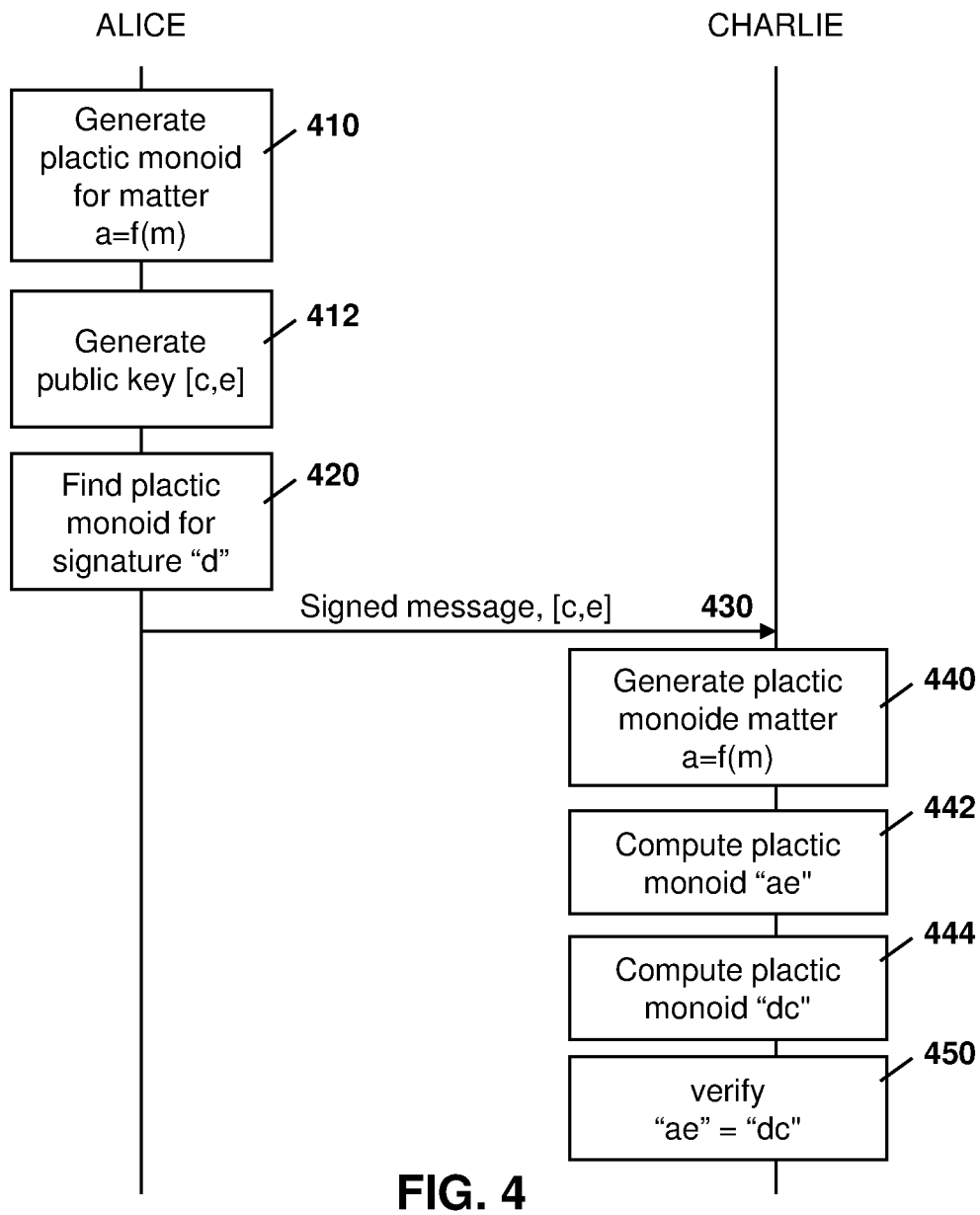
FIG. 4 is dataflow diagram showing a hashed multiplicative signature scheme utilizing plactic monoids.

Reference is now made to FIG. 4. In the embodiment of FIG. 4, Alice wishes to sign a message m through a plactic signature scheme. In particular, as with FIGS. 1 and 2, Alice and Charlie communicate with each other.

In accordance with the embodiment of FIG. 4, Alice, at block 410, creates the message digest a utilizing a hash function. The hash function used with FIG. 4 is not necessarily a standard hash function, since it needs to map messages into semigroup elements. Rather, a form of embedded hashing may be used.

Specifically, in the case of plactic signatures, a message may be mapped into a semistandard tableau. A traditional hash can be represented as a byte string. Standard techniques allow this byte string to be made as long as necessary. A simple way to turn a byte string into a semistandard tableau is to convert it into a string of characters or integers or any sortable entries, and then apply the Robinson-Schensted algorithm, which converts the string into a tableau.

A benefit of hashing is that a long message m can have a short hash, which usually means that the signature d=ab is short. Further, hashing algorithms are typically faster than secure semigroup multiplication.

At block 412, Alice may generate a public key [c,e] using her private key, referred to as element b. In particular, a private key b for public key [c,e] is an element b such that equation 11 above is satisfied.

A public key [c,e] is viable if there exists at least one private key b for [c,e].

At block 412, Alice can choose private key b before choosing a public key [c,e] by computing the endpoint e from equation 11 above. This results in a viable public key.

Therefore, a semistandard tableau for e can be generated based on b and c. The generation can use the examples of Tables 6 and 7, for example.

At block 420, the raw signature d can be computed by Alice. Specifically, a semistandard tableau for d can be generated based on a and b. The generation can use the examples of Tables 6 and 7, for example.

Alice may then provide the signed message in the form [m,d,f] in message 230 to Charlie. In some embodiments, message 430 may further include Alice's public key [c,e]. However, as cis known system wide, it may in some cases not form part of message 430. Further, the endpoint for Alice may be published in other ways besides in message 430 and therefore, in some cases the public key is not provided in message 430.

Further, if f is a keyed hash function having a key k, the hash function h may be fixed across the whole system. In this case, the key k is sufficient to specify function f. This allows f to have a short specification so that the signature [d,f] is not too long. For example, the signature could be [d,k].

In this case, message 430 could transmit the signed message as [m,d,k] rather than [m,d,f].

Further, in some embodiments, the key k can be fixed for the whole system. In this case, it may be unnecessary for a signer to transmit the key k to the verifier. In this case, the signed message [m,d,f] reduces to [m,d] in message 430.

Further, in some cases, the multiplicative signature scheme from the embodiment of FIG. 1 could be used in plactic signatures when the hash function is an identity function in the embodiment of FIG. 4.

Charlie receives message 430 and at block 440 may generate the matter a=f(m). Specifically, at block 440, Charlie creates the message digest a utilizing the same hash function as Alice used.

At block 442 Charlie may compute the endmatter ae by multiplying elements a and e using Knuth multiplication.

At block 444, Charlie may compute the signcheck dc by multiplying elements d and c using Knuth multiplication.

At block 450, a check can be made to determine whether the endmatter and the signcheck are the same. Specifically, the signed matter [m,d,f] is verifiable for [c,e] semistandard tableau.

Therefore, based on the results of block 450, Charlie can verify whether Alice signed matter m.

In a simplified example, using the identify function as the hash function, a message "helloworld" as found in Table 6 above may be the a or m for the equations above.

Assume that Alice has a simple private key b as "privatekey". The checker c is the string "checker".

Based on these values, d=ab results in the following tableau:

TABLE 8

Example signature w
hor
ell
dikv
aeeloprty

The endpoint is e=bc and is shown in Table 9 below:

TABLE 9

Example endpoint v
p
ir
hkt
eeky
acceer

Therefore [a,d] and [c,e] can be obtained by Charlie, who can calculate the endmatter ae as:

TABLE 10

Example endmatter w
o
lr
hilv
ehkl
deekot
acceeprry

Further, Charlie can calculate the signcheck dc as:

TABLE 11

Example signcheck w
o
lr
hilv
ehkl
deekot
acceeprry

Based on the above, the endmatter and signcheck match, and therefore Alice signed the message.

While the Examples of Tables 8 to 11 are simplified for illustration, in practice stronger checker and private keys would be used. Further, the use of a hash other than a unitary hash is also possible.

In the above, security is provided by having a difficult division. In particular, private key b for public key [c,e] could be found using a division operator by computing b=e/c.

To ensure that signatures are secure, division must therefore be difficult, at least for any inputs e and c using in signatures, or else an attacker could find the private key and sign any message.

Further, for security, the semigroup should not have a fast cross-multiplier. In particular, a cross-multiplier is an operator, written as */ such that:

$$(y*/x)x=(x*/y)y \qquad (18)$$

Equation 18 only holds if there are values u and v such that ux=vy.

Some semigroups have fast cross-multipliers. In a commutative semigroup x*/y=x defines a cross multiplier. In a semigroup with a zero element, x*/y=0 defies a cross multiplier. In a group with efficient inversion, x*/y=y$^{-1}$ defines a cross multiplier.

The plactic monoid is non-communitive, has no zero element and has no inverse and so therefore these three definitions fail to give cross multipliers for a plactic monoid.

A further attack vector is to forge unhashed signatures. To forge a matter a in an unhashed multiplicative, an attempt to factor a=$a_2 a_1$ is performed. A signer is then asked to sign matter $a_1$. The signer returns a signature $d_1$. the forger can then compute d=$a_2 d_1$, which is a valid signature on matter a. in this case, the forgery is aided by the signer.

Based on the above, a hashed multiplicative signature may need to be used to implement plactic signatures in some cases.

Therefore, plactic signatures could be used for digital signatures. Plactic signatures have no known quantum vulnerabilities and could therefore be used to provide additional security to communications.

The above methods may be implemented using any computing device. One simplified diagram of a computing device is shown with regard to FIG. 5. The computing device of FIG. 5 could be any fixed or mobile computing device.

Figure 5:
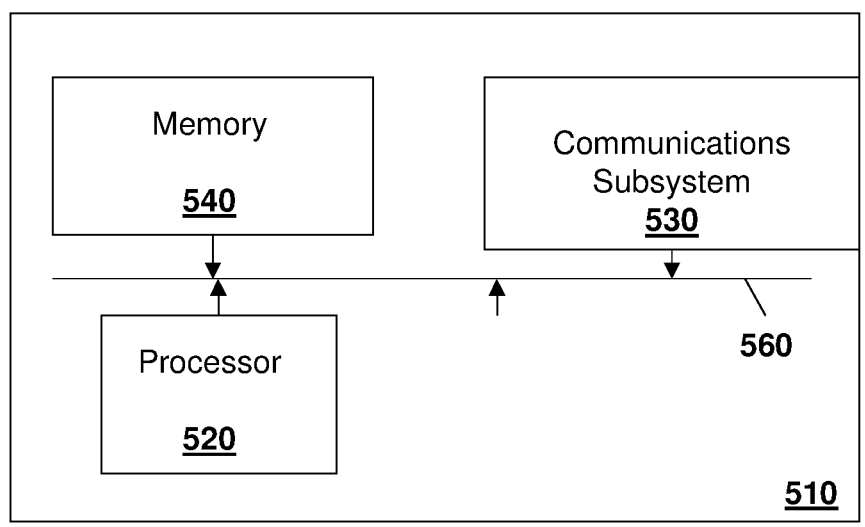
FIG. 5 is a block diagram of a simplified computing device capable of being used with the embodiments of the present disclosure.

In FIG. 5, device 510 includes a processor 520 and a communications subsystem 530, where the processor 520 and communications subsystem 530 cooperate to perform the methods of the embodiments described above. Communications subsystem 530 may, in some embodiments, comprise multiple subsystems, for example for different radio technologies.

Processor 520 is configured to execute programmable logic, which may be stored, along with data, on device 510, and shown in the example of FIG. 5 as memory 540. Memory 540 can be any tangible, non-transitory computer readable storage medium which stores instruction code that, when executed by processor 520 cause device 510 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 540, device 510 may access data or programmable logic from an external storage medium, for example through communications subsystem 530.

Communications subsystem 530 allows device 510 to communicate with other devices or network elements and may vary based on the type of communication being performed. Further, communications subsystem 530 may comprise a plurality of communications technologies, including any wired or wireless communications technology.

Communications between the various elements of device 510 may be through an internal bus 560 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for signing a message to be sent from a first party to a second party over a public communications channel, the method comprising:
   creating, by the computing device, a message digest "a" from the message, the message digest "a" belonging to a semigroup;
   obtaining, by the computing device, a private key "b" for the first party, the private key "b" having a corresponding public key [c,e] for the first party, elements of the public key including a checker "c" and an endpoint "e", checker "c" and endpoint "e" belonging to the semigroup and the endpoint comprising a multiplication of a private key "b" for the first party and the checker "c";
   computing a signature "d" at the computing device, the signature comprising multiplication of the message digest "a" and the private key "b"; and
   sending the message to the second party with the signature.

2. The method of claim 1, wherein the semigroup is chosen based on trial elimination, in which semigroups having a cryptographic structure that is computationally vulnerable are eliminated from being chosen.

3. The method of claim 1, wherein the semigroup is chosen based on restriction, wherein restriction comprises:
   examining at least one property of the semigroup; and
   removing the semigroup from being chosen when the property is computationally vulnerable.

4. The method of claim 3, wherein the properties comprise at least one property selected from a list of properties including: finite semigroups, monoid semigroups, idempotent semigroups, commutative semigroups, exponential growth semigroups, cancellative semigroups, groups, regular semigroups, nilpotent semigroups, fundamental semigroups, or bisimple semigroups.

5. The method of claim 1, wherein the semigroups are constructed from a combination of at least two building blocks.

6. The method of claim 5, wherein the each building block is selected from a listing including: numerical semigroups, groups, subsemigroups, image semigroups, restriction semigroups, extended semigroups, converse semigroups, product semigroups, compusitum semigroups, disjunctions semigroups, Rees matrix semigroups, polynomial function semigroups, monogenic semigroups, zero semigroups, left and right semigroups, Boolean semigroups, word semigroups, transformation semigroups, partial transformation semigroups, relation semigroups, arbitrary binary operation semigroups, semiautomata semigroups, semigroups from totally order sets and lattices, characteristic semigroup of a semigroup, semigroup from semirings, semirings with left addition and semigroup for multiplication, semirings with left multiplication and any idempotent semigroup for addition, semiring that is the semigroup algebra, Hahn series, extension of the semigroup algebra when the semigroup is totally ordered, Endomorphism semiring of a semigroup, Semirings from totally order sets with a selected zero-like set, Boolean semirings, Relation semirings, Semirings from lattices using meet and join, Semirings from partially order sets using the incidence algebra, Semirings with infinite sums from topologies using union for addition and intersection for multiplication, Semigroup of oriented knots or manifolds using the connected sum as the semigroup operation, Semirings with infinite sums from non-negative real numbers, Semirings with one point extensions, Semirings of polynomials, Semirings of matrices, Semirings of resultants, Semiring of category algebras, Semigroups of objects in a category with products and coproducts, Rings, Weyl algebra, Integer-value polynomials, Semiring of ideals of a ring such as standard polynomial ring, Semiring of modules of a ring under direct sum and tensor product, Semiring of fractional ideals of a ring, Semiring of continuous function defined on a unit square using the Fredholm operation for multiplication, Semigroups with error correction, or Semigroups from near-rings.

7. The method of claim 1, wherein the message digest is a hashed value.

8. The method of claim 1, wherein the semigroup is a plactic monoid, and wherein multiplication is Knuth multiplication.

9. The method of claim 8, wherein the signature "d" and endpoint "e" comprise a semistandard tableau.

10. A computing device comprising a memory and configured for signing a message to be sent from a first party to a second party over a public communications channel, the computing device comprising:
    a hardware processor; and
    a communications subsystem, wherein the hardware processor and communications subsystem are configured to:
    create a message digest "a" from the message, the message digest "a" belonging to a semigroup;
    obtain a private key "b" for the first party, the private key "b" having a corresponding public key [c,e] for the first party, elements of the public key including a checker "c" and an endpoint "e", checker "c" and endpoint "e" belonging to the semigroup and the endpoint comprising a multiplication of a private key "b" for the first party and the checker "c";
    compute a signature "d" at the computing device, the signature comprising multiplication of the message digest "a" and the private key "b"; and
    sending the message to the second party with the signature.

11. The computing device of claim 10, wherein the semigroup is chosen based on trial elimination, in which semigroups having a cryptographic structure that is computationally vulnerable are eliminated from being chosen.

12. The computing device of claim 10, wherein the semigroup is chosen based on restriction, wherein restriction comprises:
    examining at least one property of the semigroup; and
    removing the semigroup from being chosen if the property is computationally vulnerable.

13. The computing device of claim 12, wherein the properties comprise at least one property selected from a list of properties including: finite semigroups, monoid semigroups, idempotent semigroups, commutative semigroups, exponential growth semigroups, cancellative semigroups, groups, regular semigroups, nilpotent semigroups, fundamental semigroups, or bisimple semigroups.

14. The computing device of claim 10, wherein the semigroups are constructed from a combination of at least two building blocks.

15. The computing device of claim 14, wherein the each building block is selected from a listing including: numerical semigroups, groups, subsemigroups, image semigroups, restriction semigroups, extended semigroups, converse semigroups, product semigroups, compusitum semigroups, disjunctions semigroups, Rees matrix semigroups, polynomial function semigroups, monogenic semigroups, zero semigroups, left and right semigroups, Boolean semigroups, word semigroups, transformation semigroups, partial transformation semigroups, relation semigroups, arbitrary binary operation semigroups, semiautomata semigroups, semigroups from totally order sets and lattices, characteristic semigroup of a semigroup, semigroup from semirings, semirings with left addition and semigroup for multiplication, semirings with left multiplication and any idempotent semigroup for addition, semiring that is the semigroup algebra, Hahn series, extension of the semigroup algebra when the semigroup is totally ordered, Endomorphism semiring of a semigroup, Semirings from totally order sets with a selected zero-like set, Boolean semirings, Relation semirings, Semirings from lattices using meet and join, Semirings from partially order sets using the incidence algebra, Semirings with infinite sums from topologies using union for addition and intersection for multiplication, Semigroup of oriented knots or manifolds using the connected sum as the semigroup operation, Semirings with infinite sums from non-negative real numbers, Semirings with one point extensions, Semirings of polynomials, Semirings of matrices, Semirings of resultants, Semiring of category algebras, Semigroups of objects in a category with products and coproducts, Rings, Weyl algebra, Integer-value polynomials, Semiring of ideals of a ring such as standard polynomial ring, Semiring of modules of a ring under direct sum and tensor product, Semiring of fractional ideals of a ring, Semiring of continuous function defined on a unit square using the Fredholm operation for multiplication, Semigroups with error correction, or Semigroups from near-rings.

16. The computing device of claim 10, wherein the message digest is a hashed value.

17. The computing device of claim 10, wherein the semigroup is a plactic monoid, and wherein multiplication is Knuth multiplication.

18. The computing device of claim 17, wherein the signature "d" and endpoint "e" comprise a semistandard tableau.

19. A non-transitory computer readable medium for storing instruction code for verification of a signed message received from a first party over a public communications channel, the instruction code, when executed by a processor of a computing device, cause the computing device to:
create a message digest "a" from the message, the message digest "a" belonging to a semigroup;
obtain a private key "b" for the first party, the private key "b" having a corresponding public key [c, e] for the first party, elements of the public key including a checker "c" and an endpoint "e", checker "c" and endpoint "e" belonging to the semigroup and the endpoint comprising a multiplication of a private key "b" for the first party and the checker "c";
compute a signature "d" at the computing device, the signature comprising multiplication of the message digest "a" and the private key "b"; and
sending the message to the second party with the signature.

* * * * *